Nov. 25, 1958     E. W. BOLLMEIER     2,862,042

CABLE SPLICE PROTECTOR

Filed Aug. 22, 1955

INVENTOR.
EMIL WAYNE BOLLMEIER
BY
Carpenter, Abbott, Coulter & Kinney
ATTORNEYS

United States Patent Office 2,862,042
Patented Nov. 25, 1958

2,862,042

CABLE SPLICE PROTECTOR

Emil Wayne Bollmeier, Mendota Township, Dakota County, Minn., assignor to Minnesota Mining & Manufacturing Company, St. Paul, Minn., a corporation of Delaware Application August 22, 1955, Serial No. 529,826

3 Claims. (Cl. 174—93)

This invention relates to protective coverings for splices in insulated electrical conductors, and is particularly concerned with protectors designed to provide for subsequent resin encapsulation and insulation of the splice or joint. The invention furthermore has particular reference to the covering of splices in cables having rubber, resin or similar organic plastic insulating coverings, as well as the type of cable which is provided with an exterior lead sheath. The latter type of cable is ordinarily conveniently provided with a protective splice covering by employing a lead tube which is joined at its ends with the sheathing of the cable by wiping with molten solder.

The present invention provides for the insulating of cable joints in an effective and efficient manner and with a minimum of hand labor. A superior degree of insulation and protection is afforded the joint or splice. Fully adequate bonding is provided between the protective cover and the outer covering of the insulated cable. The spliced area is completely protected from the influence of moisture, and is found to remain fully effective under prolonged submersion in water. The tensile strength of the protected splice area is greater than that of the cable itself. The protector is compact and light in weight. The splice may be completed in the field with no special equipment and in a minimum of time.

Figure 1:
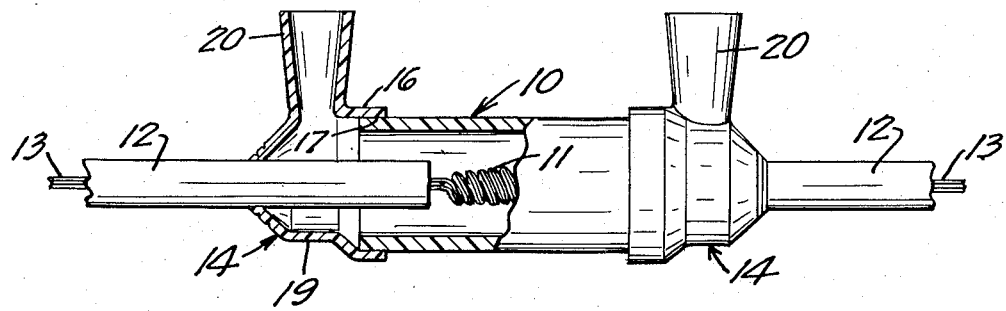
Figure 2:
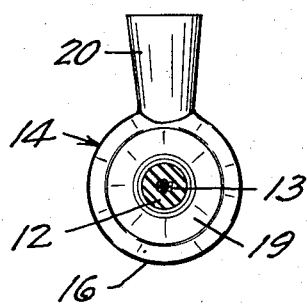
Figure 3:
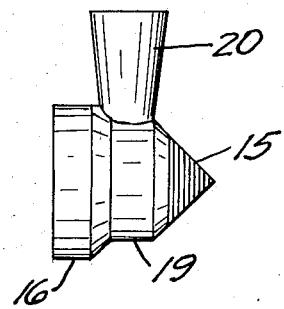
Figure 4:
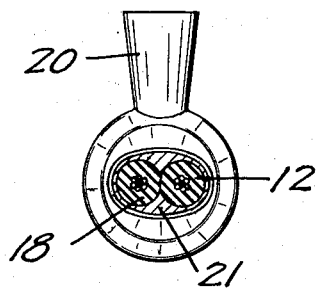

The splice protector is illustrated in the appended drawing as applied to a spliced area in an insulated electric cable. Figure 1 is a representation of the assembly in side elevation, partially in section. Figure 2 is an end elevation. Figure 3 illustrates in side elevation a connector component prior to application, and Figure 4 illustrates in end elevation a modification employed on a Y splice.

The connector component of Figure 3 has an elastic circular rim portion 16, a removable conical end portion 15, an intermediate portion 19, and an open spout or standpipe portion 20. The end 15 carries a series of concentric ring-like grooves. Prior to assembly of the protector unit, a portion of the end 15 is removed by cutting along one of these grooves to provide an opening of a size required to form a snug fit on the cable member 12.

The protector comprises an open ended cylindrical tubular member 10 surrounding the cable-splice 11 and extending over the insulated portion of the connected insulated cable portions 12 adjacent to the splice, and held in place around said cable portions by means of the elastic connecting members 14. The elastic rim portion 16 fits tightly over the smooth surfaced end area 17 of the tubular member 10, and the elastic rim portion, provided by removal of the conical tip segment, fits tightly over the insulated cable 12.

In assembling the protector device of this invention, after the conical tip segments have been removed as just indicated, the two end members 14 are first slipped over the two free unconnected cable-ends 12. The tubular member 10 is then slipped over one of the said free ends. Although the smaller elastic rim portions of the cone-shaped terminal members provide tightly fitting joints with the insulated cable, these cone-shaped members may be easily slid axially of the cable in providing proper spacing of the several components.

The cable ends are next electrically and mechanically joined together, by twisting or otherwise, to complete the desired splice 11. The spliced sections of conductor between the ends of the cable insulation may be wrapped with tape or otherwise covered if desired, but normally left bare so that subsequent impregnation of the area provides a moisture and gas block along the multi-strand conductor. The components of the splice-protector are slid into place as illustrated in the drawing, with the tubular member 10 centered over the spliced area and with the conical terminal members 14 elastically gripping the two ends of the tubular member and maintaining the same in position on the spliced cable. The open spouts are placed in the same plane by twisting or rotating the terminal members around the axis of the assembly as required.

Figure 2 is an end elevation of the assembly, showing the cable 12 and its conductive member 13 in place within the elastic terminal member 14. It will be seen that cables of larger or smaller diameter could be as easily accommodated simply by removing more or less of the original grooved conical tip 15 of the connector member.

The modification shown in Figure 4 provides for an additional cable 18, connected to cable 12 in a Y splice within the splice-protector. Suitable putty-like material 21 seals the openings between the cables and the elastic terminal member; or a plurality of smaller conical tips may replace the single conical tip 15 of a connector member otherwise like that of Figure 3, in which event a tight fit is obtained without the putty.

Insulation and protection of the splice is completed by filling the interior of the assembled protector device with a suitable insulating composition or potting compound. While thermoplastic compositions such as asphalt, pitch, waxes, or similar materials are useful under some conditions, it is preferred to employ self-hardening liquid resinous compositions, and in particular rapidly self-hardening liquid mixtures of epoxy resin and suitable hardening and curing agents.

One such liquid self-hardening compound which has given particularly desirable results in terms of high initial fluidity, rapid cure, firm adherent bond to all contacted surfaces, high mechanical and electrical strength, and superior resistance to penetration by water or water vapor, consists of a mixture of liquid epoxy resin with a minor proportion of a liquid mixture of reagents reactive therewith and comprising liquid polythiopolymercaptan polymer and liquid polyamine. The epoxy resin is a reaction product of a bisphenol and epichlorohydrin, having free epoxy groups in the molecule. "Epon" resin No. 562 is a typical commercial example; and "Thiokol" polymer LP-2 is a commercial example of a suitable liquid polythiopolymercaptan polymer. Polyamines such as 2,4,6-tri(dimethylaminomethyl) phenol are effective activators for these compositions. The several components may be separately measured and all combined at the same time. More desirably, the amine and the polysulfide polymer are separately mixed together, and this mixture is combined with the epoxy resin just prior to pouring the composite around the splice. Mixing is conveniently accomplished in a flexible plastic bag, from which the mixture is poured directly into one of the open spouts of the splice-protector.

Adding the liquid resin through the open spout of one of the terminal portions displaces the contained air in the assembly through the other of the terminal portions and permits the resin completely to surround and impregnate the entire splicing area. Holding the assembly at a slight angle to the horizontal during the filling procedure and adding the potting compound through the lower of the two terminals is advantageous and is made possible by the height of the standpipe or spout portion 20 of the terminal member, thus providing for a slight hydrostatic head sufficient to ensure that the space is completely filled with the resinous mixture.

An alternative procedure involves supporting the assembly in verticle rather than horizontal position, sealing the opening in the lower cap, and filling the tube through the spout at the upper end. For this purpose the spout member may be eliminated from the lower cap and placed in the vertical position, i. e., parallel to the axis of the unit, on the upper cap. Resin is added, and air is simultaneously displaced, through the single open channel at the upper cap.

After the resin has hardened, the spout members, together with any hardened resin contained therein, may be cut or otherwise removed from the assembly if desired for improved appearance or to conserve space.

The hardened epoxy resin composition is firmly bonded to the outer surface of the cable-covering and to the metallic conductor as well as to the interior surface of the splice-cover assembly.

The tubular member 10 is preferably in the form of a right cylinder, but various other forms are equally well adapted; thus a tube having elliptical, rectangular, or polygonal cross-section may be employed. In such cases, the shape of the elastic rim portion 16 of the terminal member 14 will be adjusted accordingly. The tubular member may also be bulged at the central area to provide additional space for the splice 11 where desired. A bell-shaped or hemispherical intermediate section is equally as effective as the tubular and conical intermediate terminal member 14.

A slight amount of elasticity in the closely fitting rim or end portions of the cap 14 is sufficient to provide a liquid-tight seal to the tubular member and to the insulated cable. Polyethylene has been found to be particularly desirable as a material of construction for these terminal members, since the degree of elasticity is ample and the polymer is of such a nature that the terminal member may easily be slid axially of the cable during the assembly of the protector. Plasticized vinyl chloride polymer is also well adapted to this use. Polystyrene or other polyvinyl resin, nylon, or similar materials provide the required rigidity for tubular member 10, and in addition add to the dielectric strength of the insulating covering.

Other variations both in materials and in structural design, resulting in specifically different but fully equivalent structures and applications, will be apparent in view of the teachings here provided. For example, the tubular member has been split longitudinally into two half-cylinders which are snapped together, e. g., with tongue-and-groove joints along the adjacent edges, around the splice area. The interiors of the tube segments made in this way have been provided with longitudinal fins which from insulating shelf-like members separating the two or more conductors of multi-conductor cables. Splicing means, such as screw or spring connectors, have been affixed to such fins for ease in splicing the conductors.

I claim:
1. A cable splice protector useful in providing an insulating and protecting enclosure around a splice area in an insulated electric cable, comprising rigid open-ended tublar cover means for surrounding the entire splice area and extending over said insulated cable at each end of said splice area, and elastic connecting means for centering said cable within said cover means and for providing a liquid-tight seal between at least one end of said cover means and the insulated cable issuing therefrom, at least one of said elastic connecting means being provided with an extended wide-mouthed open spout member for permitting passage of fluid to or from a cable splice area enclosed by said protector and for ensuring complete filling with liquid potting compound of the enclosed space defined by said protector.

2. A cable splice protector useful in providing an insulating and protecting enclosure around a splice area in a horizontally positioned insulated electric cable, comprising a tubular member having smooth-surfaced end areas and fitting over the entire splice area, and terminal members for centering said cable within said tubular member and for sealing each end of said tubular member to the cable, each said terminal member having at one end a larger elastic rim portion tightly fitting a smooth-surfaced end area of said tubular member, having at the other end a smaller incipient elastic rim portion removably connected to a conical terminal segment and, after removal of said segment, tightly fitting over said insulated cable, and having an intermediate portion connecting said larger and smaller rim portions, said intermediate portion being provided with an extended wide-mouthed open spout for permitting passage of fluid to or from a cable splice area enclosed by said protector and for ensuring complete filling with liquid potting compound of the enclosed space defined by said protector.

3. A terminal member for centering a spliced cable axially of one end of a tubular cover member for said spliced cable and for sealing said end to said cable; said terminal member having at one end a larger elastic rim portion tightly fitting over a smooth-surfaced end area of said tubular cover member; having at the other end at least one plurally circumferentially grooved conical tip portion capable of forming, on removal of said tip at an appropriate groove, a smaller rim portion tightly fitting over said cable; and having an intermediate portion connecting said larger and smaller rim portions and being provided with extended wide-mouthed open spout means for permitting passage of fluid to or from the interior of said terminal member and said cover member.

References Cited in the file of this patent

UNITED STATES PATENTS

| | | |
|---|---|---|
| 1,775,694 | Rah | Sept, 16, 1930 |
| 2,065,315 | Keath | Dec. 22, 1936 |
| 2,106,003 | Hewitt | Jan. 18, 1938 |

FOREIGN PATENTS

| | | |
|---|---|---|
| 141,788 | Germany | May 25, 1935 |
| 219,496 | Switzerland | May 16, 1942 |

UNITED STATES PATENT OFFICE
CERTIFICATE OF CORRECTION

Patent No. 2,862,042

November 25, 1958

Emil Wayne Bollmeier

It is hereby certified that error appears in the printed specification of the above numbered patent requiring correction and that the said Letters Patent should read as corrected below.

Column 3, line 37, before "terminal" insert -- section 19 of the --; line 60, for "from" read -- form --; column 4, line 26, after "fitting" insert -- over --.

Signed and sealed this 17th day of March 1959.

(SEAL)

Attest:

KARL H. AXLINE

Attesting Officer

ROBERT C. WATSON
Commissioner of Patents